United States Patent
Hurwitz et al.

(10) Patent No.: US 10,621,242 B2
(45) Date of Patent: Apr. 14, 2020

(54) SYSTEM AND METHOD FOR GENERATING ONLINE CONTENT CREATOR PROFILES AND PROVIDING A SEARCHABLE PLATFORM FOR THE ONLINE CONTENT CREATOR PROFILES

(71) Applicant: Disney Enterprises, Inc., Burbank, CA (US)

(72) Inventors: Cherie Hurwitz, Burbank, CA (US); Benjamin Collier, Burbank, CA (US); Ryan Lissack, Los Angeles, CA (US); Kristopher Johns, Los Angeles, CA (US); Kyle Medina, Los Angeles, CA (US); Chad Wyszynski, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 594 days.

(21) Appl. No.: 14/981,697

(22) Filed: Dec. 28, 2015

(65) Prior Publication Data
US 2017/0185611 A1    Jun. 29, 2017

(51) Int. Cl.
*G06F 16/951* (2019.01)
*G06Q 30/02* (2012.01)

(52) U.S. Cl.
CPC ........... *G06F 16/951* (2019.01); *G06Q 30/02* (2013.01)

(58) Field of Classification Search
CPC .............................................. G06F 17/30864
See application file for complete search history.

(56) References Cited

U.S. PATENT DOCUMENTS

| | | |
|---|---|---|
| 2004/0230481 A1 | 11/2004 | Bushold |
| 2008/0033776 A1 | 2/2008 | Marchese |
| 2008/0065508 A1 | 3/2008 | Watt |
| 2008/0275763 A1 | 11/2008 | Tran |
| 2008/0307454 A1 | 12/2008 | Ahanger |
| 2009/0132507 A1 | 5/2009 | Kadambi |
| 2009/0157450 A1 | 6/2009 | Athsani |

(Continued)

OTHER PUBLICATIONS

U.S. Appl. No. 10/497,028, filed Dec. 3, 2019, Ryan G Lissack.
U.S. Appl. No. 10/497,029, filed Dec. 3, 2019, Ryan G Lissack.

*Primary Examiner* — Kris E Mackes
(74) *Attorney, Agent, or Firm* — Esplin & Associates, PC

(57) ABSTRACT

Systems and methods for generating online content creator profiles and providing a searchable platform for the online content creator profiles. Creator information, online content information, and/or other information may be obtained from multiple online sources. The creator information, online content information, and/or other information may be organized into creator profiles for individual ones of the creators. User defined search parameters defining a search query may be received. The user defined search parameters may indicate one or both of the creator information, the online content information, and/or other information. One or more of the individual ones of the creators may be identified based on the creator information and/or the online content information included in the creator profiles for the one or more of the individual ones of the creators satisfying the user defined search parameters. Presentation of the creator profiles for the one or more of the individual ones of the creators identified may be effectuated.

20 Claims, 3 Drawing Sheets

(56) References Cited

U.S. PATENT DOCUMENTS

| | | |
|---|---|---|
| 2009/0177588 A1 | 7/2009 | Marchese |
| 2009/0216630 A1 | 8/2009 | Carnahan |
| 2010/0228603 A1 | 9/2010 | Bolder |
| 2011/0178837 A1* | 7/2011 | Goerges ................ G06Q 10/06 705/7.28 |
| 2012/0226602 A1* | 9/2012 | Narcisse ................ G06Q 30/02 705/39 |
| 2013/0085828 A1 | 4/2013 | Schuster |
| 2013/0343726 A1* | 12/2013 | Shackleton ........ H04N 21/4532 386/282 |
| 2014/0071045 A1 | 3/2014 | Muchnick |
| 2014/0089322 A1* | 3/2014 | Garcia .............. G06F 17/30867 707/748 |
| 2014/0173644 A1 | 6/2014 | Ball |
| 2015/0112793 A1 | 4/2015 | Collier |
| 2015/0112806 A1 | 4/2015 | Collier |
| 2015/0112816 A1 | 4/2015 | Collier |
| 2015/0350259 A1* | 12/2015 | Garg ................... G06F 3/04842 709/203 |
| 2016/0148278 A1* | 5/2016 | Marth .................. G06Q 10/101 705/14.72 |
| 2016/0189198 A1* | 6/2016 | McKenzie ......... G06Q 30/0242 705/14.41 |
| 2017/0140060 A1* | 5/2017 | Cody ............... G06F 17/30876 |

* cited by examiner

SYSTEM AND METHOD FOR GENERATING ONLINE CONTENT CREATOR PROFILES AND PROVIDING A SEARCHABLE PLATFORM FOR THE ONLINE CONTENT CREATOR PROFILES

FIELD OF THE INVENTION

The systems and methods described herein generally relate to generating online content creator profiles and providing a searchable platform for the online content creator profiles.

BACKGROUND OF THE INVENTION

Online content may be monetized in a variety of ways. The users producing the online content may generate revenue for themselves and/or an entity managing an organization of producers to which they belong. Managing entities may have organizations including large quantities of content producers. Monetizing the online content may include publishing large quantities of short form online content in a variety of locations. The information related to each content producer in an organization is typically obtained and tracked manually. Due to the various locations the online content is published and the large quantity of producers in an organization, the current method for obtaining and viewing information related to producers in an organization is inefficient and limited. Furthermore, monetizing entities are typically limited to obtaining information for producers in their organization due to the work intensive process and may miss out on the benefits of obtaining information for producers belonging to other organizations.

SUMMARY

The disclosure herein relates to generating online content creator profiles and providing a searchable platform for the online content creator profiles.

The system and/or methods described herein may be configured to provide a searchable platform of online content creators by obtaining information related to the content creators from various online sources and organizing the information obtained into profiles for presentation. The information obtained from various online sources may include creator information relating to the creators of the online content, online content information relating to the online content created by those creators, and/or other information. The creator information, online content information, and/or other information may be organized into creator profiles. User defined search parameters defining a query for one or more of the creators may be received. The one or more creators satisfying the search query based on the information included in their corresponding creator profile may be identified. Presentation of the creator profiles corresponding to individual ones of the identified creators may be effectuated such that users can view and/or export the information (e.g., creator information, online content information, and/or other information) included in the creator profiles.

A system configured for generating online content creator profiles and providing a searchable platform for the online content creator profiles may include one or more server(s). The server(s) and the client computing platform(s) may communicate in a client/server configuration, and/or via another configuration. The server may include one or more processors configured by machine-readable instructions to execute computer program components. The computer program components may include a creator information component, an online content information component, a creator profile component, a search query component, an identification component, a presentation component, an export component, an analysis component, and/or other components.

The creator information component may be configured to obtain creator information relating to creators of online content. The creators of online content may include one or more of a producer, a talent, an owner, an entity having rights to, and/or other creators, of the online content. Online content may include digital media content that is published and/or available via the internet. For example, online content may include one or more of online video content, online audio content, online image content, online text content, and/or other online content. Creator information may include information describing the creators of the online content, distribution platform accounts associated with the creators, content channels managed by the creators, and/or other information related to the creators. For example, creator information may include one or more of a name, a username, a location, an image, a ranking, demographic information, a manager of the creator, creator preferences (e.g., restrictions, tendencies, likes, passions, and/or other preferences), contract information (e.g., talent contract expiration and/or other contract information), contact information, publications, subscribers and/or followers, likes received and/or upvotes received, and/or other creator information. The creator information may be obtained from multiple online sources. For example, the creator information may be obtained from one or more social media platforms, data collection entities, and/or other online sources.

Supplemental creator information relating to the creators may be received over a network by the creator information component. The supplemental creator information may be received from one or more client computing platforms associated with creators and/or other users. The supplemental creator information, for example, may include information provided by a creator.

The online content information component may be configured to obtain online content information relating to the online content created by the creators. Online content information may include information describing individual sets and/or portions of the online content, collections of the individual sets and/or portions of the online content created by a given creator, distribution platforms for the online content created by the creators; and/or the content channels for the online content created by the creators. For example, online content information may include one or more of a format, length, type, language, category and/or genre, consumption information, a target audience, rating, ranking, the online content, a portion of the online content, and/or other online content information relating to the online content and/or the distribution channel(s) of the online content.

The consumption information may include information related to reach and/or consumption of individual sets and/or portions of the online content, collections of the individual sets and/or portions of the online content created by a given creator, distribution platforms for the online content created by the creators; and/or the content channels for the online content created by the creators. For example, consumption information may include one or more of a view count, a monthly view count, a quantity of social media likes and/or shares, a quantity of subscribers and/or followers, monetization information (e.g., revenue generated and/or other monetization information), demographic information for viewers, demographic information for subscribers, and/or other consumption information.

The online content information may be obtained from multiple online sources. For example, the online content may be obtained from one or more social media platforms, data collection entities, and/or other online sources. Supplemental online content information relating to the online content created by the creators may be received over a network by the online content information component. The supplemental creator information may be received from one or more client computing platforms associated with creators and/or other users.

The creator profile component may be configured to organize one or more of the creator information, the online content information, the supplemental creator information, the supplemental online content information, and/or other information into creator profiles for individual ones of the creators. The creator profiles may include a given profile corresponding a given creator. The creator information relating to the given creator, the online content information relating to content generated by the given creator, the supplemental creator information relating to the given creator, the supplemental online content information relating to the content generated by the given creator, and/or other information may be included in the given profile.

The search query component may be configured to receive user defined search parameters defining a search query. The user defined search parameters may indicate one or both of the creator information, the online content information, and/or other information. The identification component may be configured to identify one or more of the individual ones of the creators based on the creator information, the online content information, the supplemental creator information, the supplemental online content information, an/or other information included in the creator profiles, satisfying the user defined search parameters. In some implementations, a given creator may be identified based on the creator information, the online content information, and/or other information included in the given profile satisfying the user defined search parameters.

The presentation component may be configured to effectuate presentation of the creator profiles for the one or more of the individual ones of the creators identified. For example, presentation of the given profile corresponding to the given creator identified may be effectuated. The creator profiles may be presented via a graphical user interface. In some implementations, effectuating presentation of the creator profiles may include effectuating presentation of a comparison of the creator profiles for at least two of the individual ones of the creators identified.

The export component may be configured to receive a command to export one or more of the creator information, the online content information, and/or other information included in the creator profiles. The command may indicate an export format selected by a user. The export component may be configured to transmit the creator information, online content information, supplemental creator information, supplemental online content information, and/or other information included in the creator profiles for one or more of the individual ones of the creators identified over a network. The information (e.g., creator information, online content information, supplemental creator information, supplemental online content information, and/or other information) may be transmitted according to the export format selected by the user. The export format may include one or more of a spreadsheet format, a presentation format, a text format, and/or other formats.

The analysis component may be configured to determine ranking values for the one or more of the individual ones of the creators. Ranking values may be determined based on the creator information, the online content information, and/or other information included in the creator profiles for the one or more of the individuals ones of the creators.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
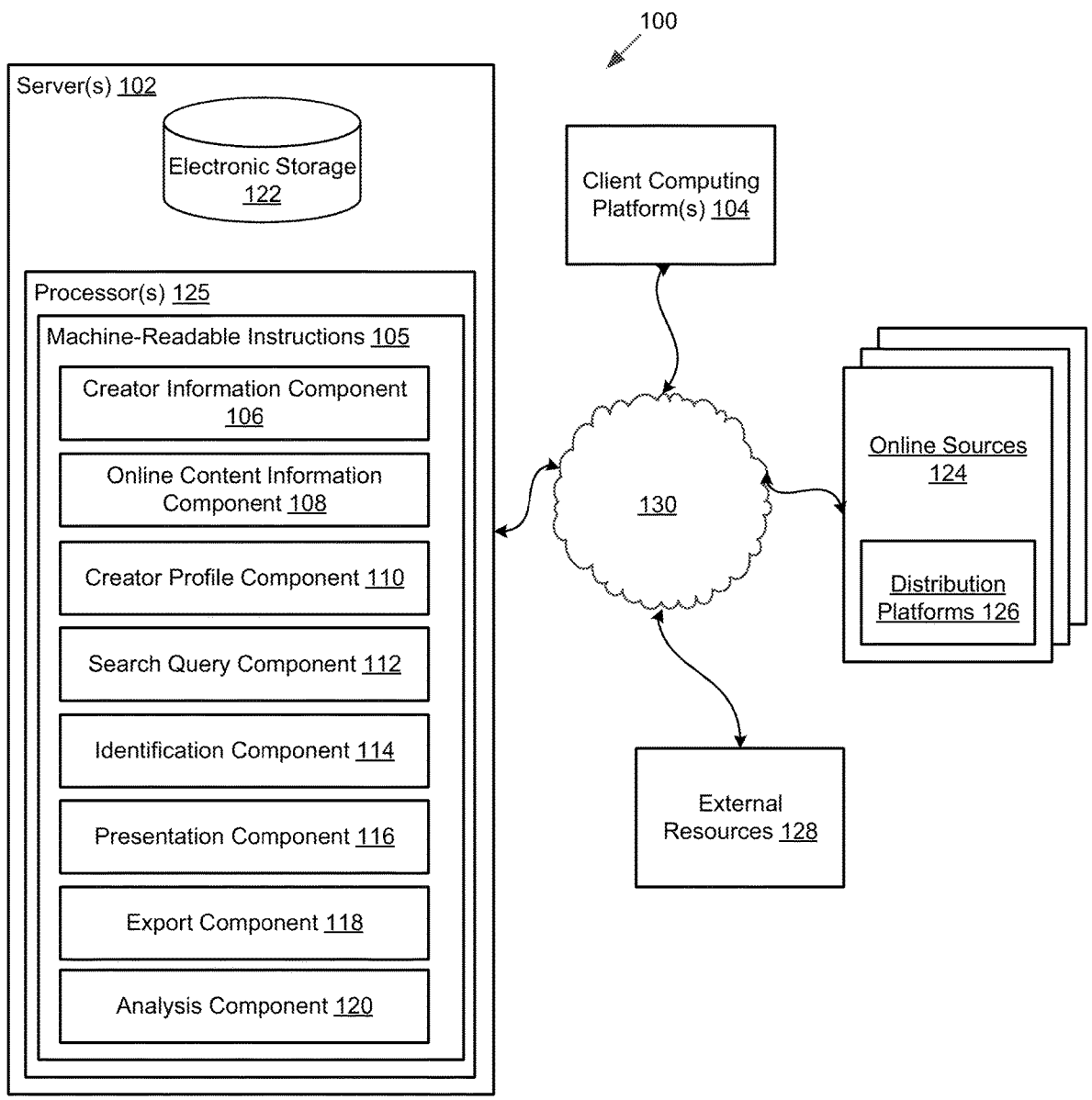
FIG. 1 illustrates a system configured for generating online content creator profiles and providing a searchable platform for the online content creator profiles, in accordance with one or more implementations.

FIG. 1 illustrates an example system 100 that is configured for generating online content creator profiles and providing a searchable platform for the online content creator profiles. The system and/or methods described herein may be configured to obtain creator information and/or online content information from multiple online sources. The creator information, online content information, and/or other information obtained may be organized into creator profiles. The system and/or method may receive user defined search parameters indicating one or more of the creator information, the online content information, and/or other information. The system and/or method may identify individual ones of the creators based on the creator information and/or online content information included in the creator profiles satisfying the user defined search parameters. Presentation of the creator profiles for the one or more creators identified may be effectuated.

As illustrated in FIG. 1, system 100 may include one or more server(s) 102, one or more client computing platform(s) 104, electronic storage 122, online sources 124 including distribution platforms 126, external resources 128, one or more physical processor(s) 125 configured to execute machine-readable instructions 105, one or more computer program components, and/or other components.

One or more physical processor(s) 125 may be configured to execute machine-readable instructions. Executing machine-readable instructions 105 may cause the one or more physical processor(s) 125 to generating online content creator profiles and providing a searchable platform for the online content creator profiles. Machine-readable instructions 105 may include one or more computer program components such as a creator information component 106, an online content information component 108, a creator profile component 110, a search query component 112, an identification component 114, a presentation component 116, an export component 118, analysis component 120, and/or other components.

In some implementations, server(s) 102 may be configured to provide remote hosting of the features and/or function of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of the client computing platform(s) 104 may include machine-readable instructions (not shown in FIG. 1) comprising the same or similar components as machine-readable instructions 105 of server(s) 102. The client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104.

The client computing platform(s) 104 may include one or more of a cellular telephone, a smartphone, a digital camera, a laptop, a tablet computer, a desktop computer, a television set-top box, smart TV, a gaming console, and/or other platforms.

Server(s) 102, client computing platform(s) 104, online sources 124, distribution platforms 126, and/or external resources 128 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platform(s) 104, online sources 124, distribution platforms 126, and/or external resources 128 may be operatively linked via some other communication media.

Creator information component 106 may be configured to obtain creator information. The creator information may relate to creators of online content. Online content may be user-generated content including digital media that may be created, generated, consumed (e.g., viewed, heard, etc.) by others users, and/or distributed via the Internet. Online content may include one or more of online video content, audio content, image content, text content, and/or other content. Creators of online content may be users that create, generate, manage, and/or distribute the online content. For example, creators of online content may include one or more of a producer of the online content, a talent of the online content, an owner of the online content, an entity having rights to the online content, and/or other creators of online content. Users may view, listen to, and/or interact with the online content created and/or shared by creators via distribution platforms 126. Distribution platforms 126 may be online platforms and/or services through which the online content is accessed by, consumed by, distributed to, and/or otherwise made available to users. Distribution platforms 126 may include social media platforms and/or other online distribution platforms. Social media platforms may include one or more of YouTube®, the Vine®, Instagram®, Facebook®, Twitter®, MAKER®, and/or other social media platforms). For example, a creator may include a talent that posts online content to an online social media. Creator information may include information describing the creators of the online content, distribution platform accounts associated with the creators, content channels managed by the creators, and/or other information related to the creators. Creator information may include one or more of a name, a username, a location, an image, a ranking, monetization (e.g., revenue, etc.) information, demographic information, a manager of the creator, creator preferences (e.g., restrictions, tendencies, likes, passions, and/or other preferences), contract information (e.g., creator manager contract expiration and/or other contract information), contact information, publications (e.g., press, articles, references, and/or other publications related to and/or including the creator), subscribers and/or followers (e.g., of the creator, a distribution platform account associated with the creator, a content channel associated with the creator, etc.), those the creator follows, likes and/or upvotes (e.g., for the creator, a distribution platform account associated with the creator, a content channel associated with the creator, etc.) received, and/or other creator information.

For example, creator information may indicate a creator's username on Instagram and that they have 500,000 followers. By way of another example, creator information for a creator that creates video reviews for toys may include creator preferences of including the types or brand of toys the creator prefers to review and/or indicating the creator will not review a certain type or brand of toys. By way of another example, a ranking may indicate a given creator's performance in various metrics compared to other creators. The various metrics, for example, may include total revenue generated for content created by the given creator, revenue generated for a specific time period (e.g., a month, a week, a day, etc.), change in revenue generated for content created by the given creator over a specific time period (e.g., a month, a week, a day, the last recorded point in time, etc.), and/or other metrics.

The creator information may be obtained from multiple online sources 124. Obtaining may include one or more of receiving, determining, deriving, aggregating, collecting, deriving, and/or otherwise obtaining the creator information from online sources 124. In some implementations, online sources 124 may include one or more distribution platforms 126. The creator information may be obtained via tapping into one or more application program interfaces (APIs) associated with the online sources 124. For example, the creator information may be obtained from online sources 124 including one or more of distribution platforms 126 (e.g., social media platforms such as YouTube®, the Vine®, Instagram®, Facebook®, Twitter®, MAKER®, and/or other social media platforms), data collection entities (e.g., monetization data and or other data related to a creator), and/or other online sources (e.g., online sources 124). In some implementations, the distribution platforms 126 may also be data collection entities. For example, a given creator's name, location, and/or image may be obtained from Facebook and/or the given creator's monetization and/or revenue generation metrics may be obtained from a data collection entity (e.g., Google Analytics®, YouTube® Analytics, MAKER®, etc.).

In some implementations, creator information component 106 may be configured to receive supplemental creator information relating to the creators. The supplemental creator information may be received over the network from one or more client computing platforms associated with creators and/or other users. The supplemental creator information may include information provided, input, and/or selected by a creator and/or other user. For example, a creator may provide one or more of their preferences, a username, contact information, an image, contract information, and/or other creator information to be included in their creator profile.

Online content information component 108 may be configured to obtain online content information. The online content information may relate to the online content created by the creators. As such, the online content information may relate to and/or describe individual sets and/or portions of the online content, and/or collections of the individual sets and/or portions of the online content created by a given creator. For example, the online content information may describe individual sets or portions of the online content, one or more distribution platform(s) through which the online content created by the given creator is distributed online, one or more content channels including online content created by the given creator, and/or other aspects related to the online content created by the given creator. The online content information may include one or more of a format, length, quality, size, type, language, category, genre, consumption information, a target audience, rating, ranking, the online content, a portion of the online content, distribution channel information (e.g., information related to a MAKER® channel, a YouTube® channel, etc.), requirements/restrictions (e.g., for the online content, the distribution platform, the content channel, etc.), and/or other online content information. For example, the online content information may include the file size, resolution, and/or language spoken in one or more sets or portions of the online content, and/or collections of the individual sets and/or portions of the online content created by a given creator. By way of another example, the online content information may include the most viewed video(s), best work, and/or most shared video(s) (e.g., the actual video(s), video files, information describing the videos, and/or metric information for the videos) created by a given creator. By way of another example, online content information for a content channel that hosts video reviews for toys may indicate the channel genre is toys and/or reviews, that the target audience for the channel is families including kids ages 5-10, and/or that a restriction for the online content hosted by the channel restricts (e.g., does not include and/or allow) video reviews of certain brands.

The consumption information may include information related to reach and/or consumption of the individual sets and/or portions of the online content, and/or collections of the individual sets and/or portions of the online content created by a given creator; and/or the content channels for the online content created by the creators. For example, consumption information may include one or more of a view count, a monthly view count, a quantity of social media likes and/or upvotes, and/or shares, a quantity of subscribers and/or followers, monetization information (e.g., revenue generated and/or other monetization information), demographic information for viewers, demographic information for subscribers and/or followers, and/or other consumption information. As such, the consumption information may relate to and/or describe the online content created by a given creator, a distribution platform through which the online content created by the given creator is distributed online, the content channels for the online content created by the creators, and/or other aspects related to the reach and/or consumption of the online content created by the given creator.

The online content information may be obtained from multiple online sources 124. Obtaining may include one or more of receiving, determining, deriving, aggregating, collecting, deriving, and/or otherwise obtaining the online content information from multiple online sources 124. The online content information may be obtained via tapping into one or more application program interfaces (APIs) associated with the multiple online sources 124. For example, the online content may be obtained from one or more distribution platforms 126 (e.g., social media platforms such as YouTube®, the Vine®, Instagram®, Facebook®, Twitter®, MAKER®, and/or other social media platforms), data collection entities (e.g., monetization data and or other data related to a creator), and/or other online sources. In some implementations, the distribution platforms may include data collection entities. For example, a view count, number of likes and/or upvotes, and/or number of shares for an online video created by a given creator may be obtained from Facebook and/or a quantity of subscribers and/or followers for the given creator's YouTube channel via which the online video is shared may be obtained from YouTube®.

In some implementations, creator information component 106 may be configured to receive supplemental online content information. The supplemental online content information may relate to the online content created by the creators. For example, the supplemental online content information may relate to and/or describe individual sets and/or portions of the online content, and/or collections of the individual sets and/or portions of the online content created by a given creator. The supplemental online content information may be received over the network from one or more client computing platforms associated with creators and/or other users. The supplemental online content information may include information provided, input, and/or selected by a creator and/or other user.

Creator profile component 110 may be configured to organize one or more of the creator information, the online content information, the supplemental creator information, the supplemental online content information, and/or other information into creator profiles for individual ones of the creators. The creator profiles for individual ones of the creators may provide, for example, a synopsis and/or overview of the individual ones of the creators and the content they create. In some implementations, creator profile component 110 may be configured to process and/or normalize the creator information, the online content information, the supplemental creator information, the supplemental online content information, and/or other information obtained. As such, the information included in the creator profiles may be searchable, and/or have a consistent format.

Organizing one or more of the creator information, the online content information, the supplemental creator information, the supplemental online content information, and/or other information into creator profiles for individual ones of the creators may include generating the creator profiles to include one of more of the creator information, the online content information, the supplemental creator information, the supplemental online content information, and/or other information obtained that is associated with the individual ones of the creators. In some implementations, organizing the creator information, online content information, supplemental creator information, supplemental online content information, and/or other information into creator profiles may include comparing current information to previously obtained information. Individuals ones of the creator profiles may correspond with the individuals ones of the creators such that a given creator has a given corresponding creator profile.

The creator profiles may include a first profile for a first creator, a second profile for a second creator, and/or other creator profiles. The creator information relating to the first creator, the online content information relating to content generated by the first creator, the supplemental creator information relating to the first creator, the supplemental online content information relating to the content generated by the first creator, and/or other information may be included in the first profile. The creator information relating to the second creator, the online content information relating to content generated by the second creator, and/or other information may be included in the second profile. In some implementations a comparison of previously obtained creator information, online content information, supplemental creator information, supplemental online content information, and/or other information to more recently obtained creator information, online content information, supplemental creator information, supplemental online content information, and/or other information may be included in the creator profiles. For example, the comparison may illustrate a change in monetization (e.g., revenue, etc.) and/or ranking associated with a given creator and/or online content item created by the given creator from one measured time period to the next (e.g., week to week, month to month, day to day, etc.).

Search query component 112 may be configured to receive user defined search parameters defining a search query. The user defined search parameters may indicate one or both of the creator information, the online content information, and/or other information. The user defined search parameters may indicate that a user searching for creator profiles corresponding to creators that include creator information, the online content information, and/or other information that satisfies the user defined search parameters.

Identification component 114 may be configured to identify one or more of the individual ones of the creators based on the creator information, the online content information, the supplemental creator information, the supplemental online content information, an/or other information included in the creator profiles for the one or more of the individual ones of the creators satisfying the user defined search parameters. Information that satisfies the user defined search parameters may include information that matches (and/or closely matches) the user defined search parameters, and/or information that falls within a range and/or value indicated by the user defined search parameters. For example, the first creator may be identified based on the creator information, the online content information, and/or other information included in the first profile satisfying the user defined search parameters. One or more of the creators may be identified responsive to search query component receiving the user defined search parameters defining a search query and/or a user initiating the search query.

The user defined search parameters may include input provided and/or selected by one or more users indicating one or more of a talent name, a channel name, a subscriber quantity range, a monthly view range, a vertical and/or topic, a category, a content format, a language, a location, a range of social media feedback, a range of distribution channel subscribers/followers, a talent manager, and/or other user defined search parameters.

Presentation component 116 may be configured to effectuate presentation of the creator profiles. Presentation of the creator profiles may be effectuated for the one or more of the individual ones of the creators identified. For example, presentation of the first profile may be effectuated. The creator profiles may be presented via a graphical user interface displayed on one or more displays associated with system 100 (e.g., a display for system 100, external resources 128, a display associated with client computing platform(s) 104, and/or other displays). In some implementations, the creator profiles may be presented in an abridged form such that multiple creator profiles corresponding to the identified creators (e.g., the results of a search query) may be displayed. A user may select an abridged creator profile to view the entire creator profile for a given creator.

In some implementations, presentation component 116 may be configured such that effectuating presentation of the creator profiles includes effectuating presentation of a comparison of the creator profiles. The comparison of the creator profiles may include a comparison of at least two of the individual ones of the creators identified by identification component 114.

Figure 2:
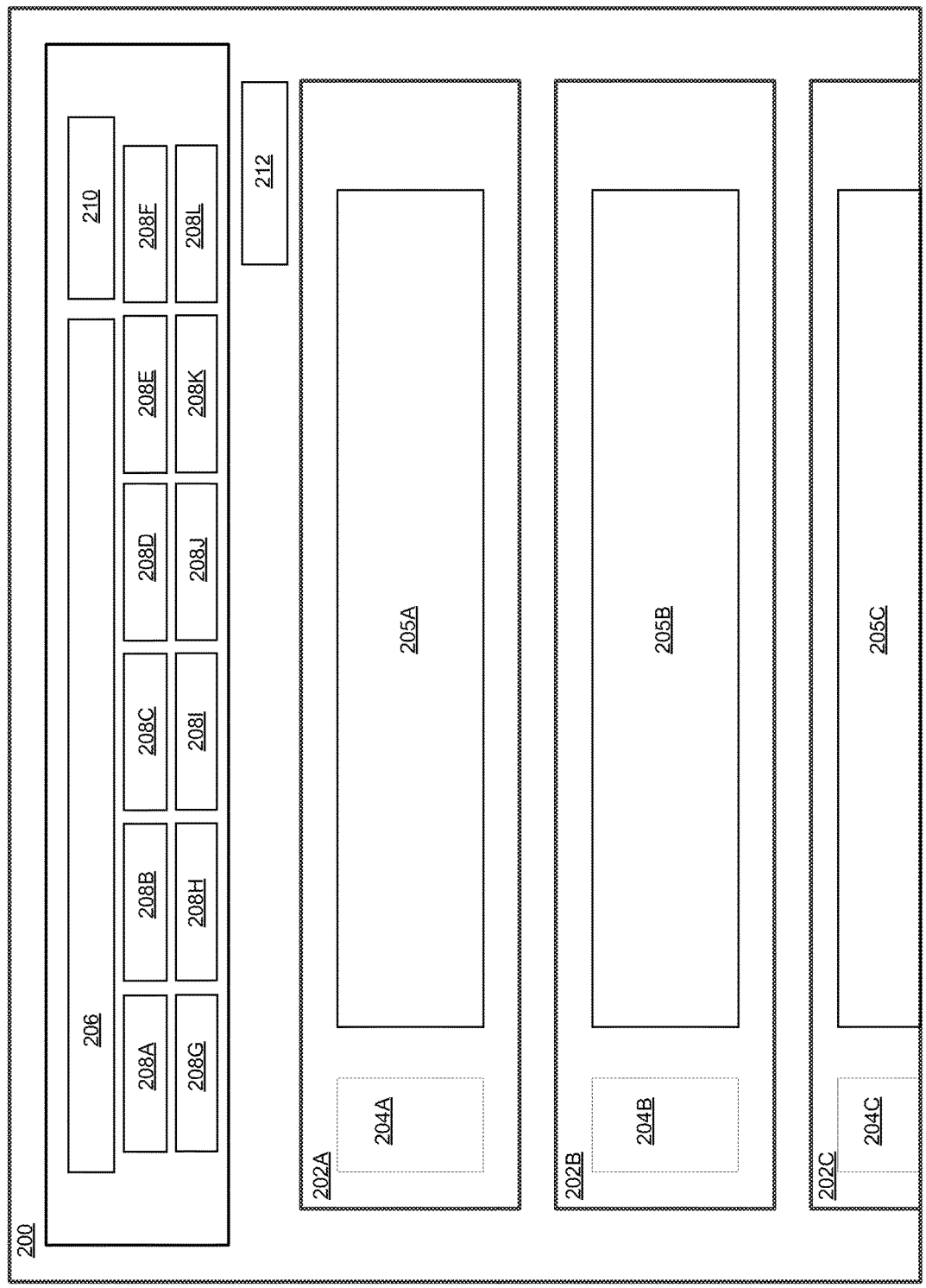
FIG. 2 illustrates an example graphical user interface, in accordance with one or more implementations.

By way of illustration, FIG. 2 depicts an example graphical user interface (GUI) 200, in accordance with one or more implementations. GUI 200 may be configured to display one or more creator profiles 202. Creator profiles 202 may include creator information relating to one or more creators identified based on user defined search parameters, online content information relating to content generated by the one or more creators identified based on the user defined search parameters, and/or other information may be included in the first profile. For example, fields 204 may include one or more an image of and/or representing a creator, an avatar representing the creator, a logo or symbol representing the creator, a location of the creator, a name/username of the creator, and/or other creator information corresponding to one of creator profiles 204. For example, creator profile 202A may correspond to a given creator such that creator profile 202A includes creator information in field 204A relating to the given creator, online content information in filed 205A relating to content generated by the given creator, and/or other information relating to the given creator.

GUI 200 may include one or more of search field 206, parameter fields 208, button 210, and/or other fields. Search field 206 may include an search field within which a user may type and/or insert text, and/or any other input control. The text may indicate a creator name, online content distribution channel, and/or other search parameter. Parameter fields 208 may include one or more of a dropdown list, button, toggle, radio button, list box, button, toggle, text filed, date/time picker, and/or other input controls and/or interface elements. Button 210 may enable a user to set the user defined search parameters and/or initiate a search for identifying one or more creators based on information (e.g., creator information, online content information, and/or other information) included in the creator profiles. In some implementations, creator profiles 202 may include creator profiles corresponding to creators identified by a search defined by a user via search parameter fields 206, 208. In some implementations, GUI 200 may include export button 212. Export button 212 may be configured to initiate an export of one or more of creator profiles 202 responsive to a user selecting export button 212.

Returning to FIG. 1, export component 118 may be configured to receive a command to export one or more of the creator information, the online content information, and/or other information included in the creator profiles. Export component 118 may be configured to export the creator information, the online content information, and/or other information included in the creator profiles for one or more of the individual ones of the creators identified by identification component 114. The command to export may be received over a network from a client computing platform associated with a user. The command may indicate an export format selected by the user. The export format may include one or more of a spreadsheet format (e.g., .xls, .xlsx, .xlsm, .numbers, .csv, .tsb, .tab, and/or other spreadsheet formats), a presentation format (.ppt, .pptm, .pdf, and/or other presentation formats), a text format (.txt, .rtf, .doc, .docx, .pdf, and/or other text formats), and/or other formats. In some implementations, the creator information, the online content information, and/or other information included in the creator profiles may be exported such that the creator profiles are presented as a whole and/or in a new format.

Export component 118 may be configured to transmit one or more of the creator information, the online content information, and/or other information included in the creator profiles for the one or more of the individual ones of the creators identified. The creator information, the online content information, and/or other information included in the creator profiles may be transmitted over the network. The creator information, the online content information, and/or other information included in the creator profiles may be transmitted according to the export format selected by the user. For example, responsive to a user selecting a presentation format, the creator information, the online content information, and/or other information included in the creator profiles for the one or more of the individual ones of the creators identified may be exported such that the user may open a presentation (e.g., a Powerpoint Presentation®) of the creator profiles, the creator information, the online content information, and/or other information included in the creator profiles for the one or more of the individual ones of the creators identified. In some implementations, the exported presentation may be templated such that some or all of the information included in the creator profiles is entered into a presentation application template.

Analysis component 120 may be configured to determine ranking values for the one or more of the individual ones of the creators. The ranking values may be determined based on the creator information relating to the one or more of the individual ones of the creators, the content information relating to the content generated by the one or more of the individual ones of the creators, and/or other information included in the creator profiles for the one or more of the individuals ones of the creators. For example, the ranking value may be based on a given creator's performance in various metrics compared to other creators. The various metrics, for example, may include total revenue generated for content created by the given creator, revenue generated for a specific time period (e.g., a month, a week, a day, etc.), change in revenue generated for content created by the given creator over a specific time period (e.g., a month, a week, a day, the last recorded point in time, etc.), and/or other metrics.

In some implementations, analysis component 120 may be configured to provide predictive analysis indicating a predicted effect of one or more potential actions on one or more of a creator ranking, revenue generated by a creator and/or online content created by the creator, monetization of the creator and/or the online content created by the creator, and/or other information. Potential actions may include actions performed by creators to further promote, monetize, and/or otherwise increase the reach of the content they create. For example, analysis component 120 may be configured to predict that a given creator's ranking will increase from $45^{th}$ to $40^{th}$ for the week if they publish a new video to their YouTube® channel on Tuesday between 6:00 and 7:00 pm.

Returning to FIG. 1, the server(s) 102, client computing platforms 104, and/or external resources 128 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platforms 104, and/or external resources 128 may be operatively linked via some other communication media.

The external resources 128 may include sources of information, hosts and/or providers outside of system 100, external entities participating with system 100, external entities for digital content and/or digital content platforms, and/or other resources. In some implementations, some or all of the functionality attributed herein to external resources 128 may be provided by resources included in system 100.

The server(s) 102 may include electronic storage 122, one or more processor(s) 125, and/or other components. The server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 125, information received from server(s) 102, information received from client computing platform(s) 104, and/or other information that enables server(s) 102 to function as described herein.

Processor(s) 125 are configured to provide information processing capabilities in server(s) 102. As such, processor(s) 125 may include one or more of a digital processor, an analog processor, a digital circuit designed to process information, an analog circuit designed to process information, a state machine, and/or other mechanisms for electronically processing information. Although processor(s) 125 are shown in FIG. 1 as a single entity, this is for illustrative purposes only. In some implementations, processor(s) 125 may include one or more processing units. These processing units may be physically located within the same device, or processor(s) 125 may represent processing functionality of a plurality of devices operating in coordination. The processor 125 may be configured to execute components 106-120. Processor 125 may be configured to execute components 108, 110, 111, 112, 114, 116, 118, and/or 120, by software; hardware; firmware; some combination of software, hardware, and/or firmware; and/or other mechanisms for configuring processing capabilities on processor(s) 125.

It should be appreciated that although components 106-120 are illustrated in FIG. 1 as being located and/or co-located within a particular component of system 100, in implementations in which physical processor(s) 125 include multiple processing units, one or more of components 106-120 may be located remotely from the other components. The description of the functionality provided by the different components 106-120 described herein is for illustrative purposes, and is not intended to be limiting, as any of components 106-120 may provide more or less functionality than is described. For example, one or more of components 106-120 may be eliminated, and some or all of its functionality may be incorporated, shared, integrated into, and/or otherwise provided by other ones of components 106-120. Note that physical processor(s) 125 may be configured to execute one or more additional components that may perform some or all of the functionality attributed herein to one of components 106-120.

One or more of the components of system 100 may be configured to present and/or provide a user interface to provide an interface between system 100 and a user (e.g. a creator, and/or other users using a graphical user interface) through which the user can provide information to and receive information from system 100. This enables data, results, and/or instructions (e.g., determinations, selections, and/or other indications) and any other communicable items, collectively referred to as "information," to be communicated between the user and system 100. An example of information that may be conveyed by a user and/or creator is user defined search parameters, supplemental creator information, supplemental online content information, and/or other information. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 3:
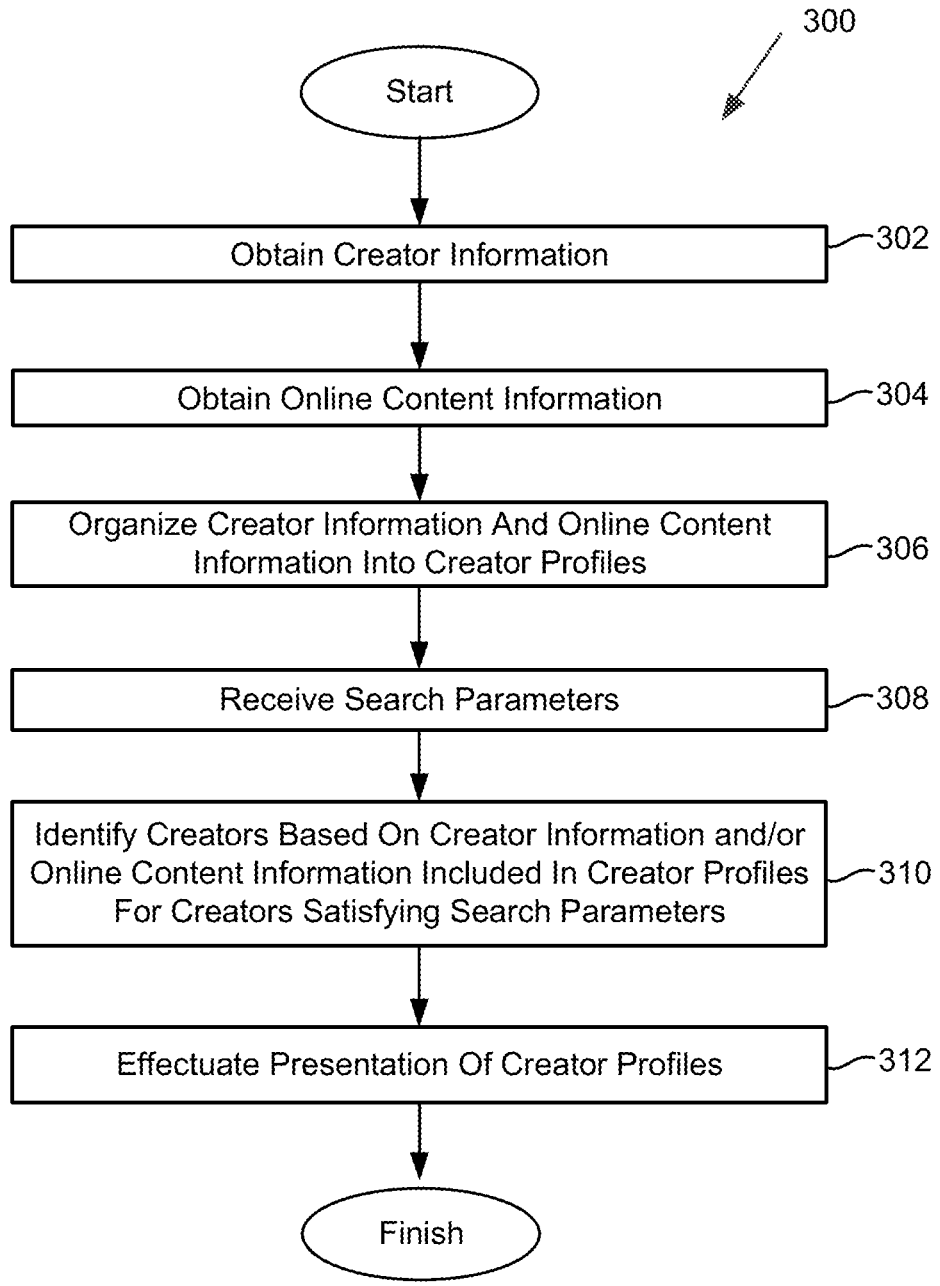
FIG. 3 illustrates a method configured for generating online content creator profiles and providing a searchable platform for the online content creator profiles, in accordance with one or more implementations.

FIG. 3 illustrates an exemplary method 300 for generating online content creator profiles and providing a searchable platform for the online content creator profiles, in accordance with one or more implementations. The operations of method 300 presented below are intended to be illustrative and non-limiting examples. In certain implementations, method 300 may be accomplished with one or more additional operations not described, and/or without one or more of the operations discussed. Additionally, the order in which the operations of method 300 are illustrated in FIG. 3 and described below is not intended to be limiting.

In certain implementations, method 300 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Regarding method 300, at an operation 302, creator information may be obtained. Creator information may be obtained from multiple online sources. In some implementations, the multiple online sources may be the same as or similar to online sources 124 (shown in FIG. 1 and described herein). The creator information may related to creators of online content. In some implementations, operation 302 is performed by a creator information component the same as or similar to creator information component 106 (shown in FIG. 1 and described herein).

At an operation 304, online content information may be obtained. Online content information may be obtained from the multiple online sources. The online content information may relate to the online content created by the creators. The online content information may include consumption information. In some implementations, operation 304 is performed by an online content information component the same as or similar to online content information component 108 (shown in FIG. 1 and described herein).

At an operation 306, the creator information and the online content information may be organized into creator profiles for individual ones of the creators. The creator profiles may include a first profile for a first creator and/or a second profile for a second creator. The creator information relating to the first creator and/or the online content information relating to content generated by the first creator may be included in the first profile. The creator information relating to the second creator and/or the online content information relating to content generated by the second creator may be included in the second profile. In some implementations, operation 306 is performed by a creator profile component the same as or similar to creator profile component 110 (shown in FIG. 1 and described herein).

At an operation 308, user defined search parameters defining a search query may be received. The user defined search parameters may indicate one or both of the creator information and/or the online content information. In some implementations, operation 308 is performed by a search query component the same as or similar to search query component 112(shown in FIG. 1 and described herein).

At an operation 310, one or more of the individual ones of the creators may be identified. One or more of the individual ones of the creators may be identified based on the creator information and/or the online content information included in the creator profiles for the one or more of the individual ones of the creators satisfying the user defined search parameters. The first creator may be identified based on the creator information and/or the online content information included in the first profile satisfying the user defined search parameters. In some implementations, operation 310 is performed by an identification component the same as or similar to identification component 114 (shown in FIG. 1 and described herein).

At an operation 312, presentation of the creator profiles for the one or more of the individual ones of the creators identified may be effectuated. As such, presentation of the first profile may be effectuated. In some implementations, operation 312 is performed by a presentation component the same as or similar to presentation component 116 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured for generating online content creator profiles and providing a searchable platform for the online content creator profiles, the system comprising:
    one or more processors configured by machine-readable instructions to:
        collect creator information from multiple online sources including distribution platforms and/or data collection entities, the creator information including monetization information, the monetization information providing direct indications of revenue generated by the creators, such that an indication of revenue generation by an individual creator includes one or more of a total revenue generated for content created by the individual creator, revenue generated for a specific time period, or change in revenue generated for content created by the individual creator over a specific time period;
        obtain supplemental creator information, the supplemental creator information relating to creators of online content;
        obtain online content information from the multiple online sources, the online content information relating to the online content created by the creators, the online content information including consumption information;
        organize the creator information, the supplemental creator information, and the online content information into creator profiles for individual ones of the creators, the creator profiles including a first profile for a first creator and a second profile for a second creator, wherein the creator information and the supplemental creator information relating to the first creator and the online content information relating to content generated by the first creator are included in the first profile, and the creator information and the supplemental creator information relating to the second creator and the online content information relating to content generated by the second creator are included in the second profile;
        receive user defined search parameters defining a search query, wherein the user defined search parameters indicate the creator information including the monetization information;
        identify one or more of the individual ones of the creators based on the creator information including the monetization information included in the creator profiles for the one or more of the individual ones of the creators satisfying the user defined search parameters, wherein the first creator is identified based on the creator information including the monetization information included in the first profile satisfying the user defined search parameters;
        effectuate presentation of the creator profiles for the one or more of the individual ones of the creators identified, such that presentation of the first profile is effectuated.

2. The system of claim 1, wherein the creator information includes information describing one or more of the creators of the online content, distribution platform accounts associated with the creators, and/or content channels managed by the creators, the creator information including one or more of a name, a username, a location, an image, a ranking, demographic information, a manager of the creator, creator preferences, contract information, contact information, publications, subscribers and/or followers, and/or upvotes received.

3. The system of claim 1, wherein the user defined search parameters further indicate the online content information and the identification of one or more of the individual ones of the creators is further based the online content information, wherein the online content information includes information describing one or more of individual sets and/or portions of the online content created by the creators, collections of the individual sets and/or portions of the online content created by the creators, distribution platforms for the online content created by the creators; and/or content channels for the online content created by the creators, the online content information including one or more of a format, length, quality, size, type, language, category and/or genre, consumption information, a target audience, a rating, a raking, the online content, and/or a portion of the online content.

4. The system of claim 1, wherein the user defined search parameters further indicate the consumption information and the identification of one or more of the individual ones of the creators is further based the consumption information, wherein the consumption information includes information related to reach and/or consumption of one or more of individual sets and/or portions of the online content created by the creators, collections of the individual sets and/or portions of the online content created by the creators, distribution platforms for the online content created by the creators; and/or content channels for the online content created by the creators, the consumption information including one or more of a view count, a monthly view count, a quantity of social media likes, a quantity of social media shares, a quantity of upvotes, a quantity of subscribers and/or followers, and/or monetization information.

5. The system of claim 1, wherein the one or more processors are further configured by machine-readable instructions to:
    receive a command, over the network, from a client computing platform associated with a user, to export the creator information and the online content information included in the creator profiles for the one or more of the individual ones of the creators identified, wherein the command indicates an export format selected by the user;
    transmit the creator information and the online content information included in the creator profiles for the one or more of the individual ones of the creators identified over the network according to the export format selected by the user.

6. The system of claim 5, wherein the export format selected by the user includes one or both of a spreadsheet format and a presentation format.

7. The system of claim 1, wherein the one or more processors are further configured by machine-readable instructions to:
receive, over the network from one or more client computing platforms associated with the creators and/or other users, the supplemental creator information relating to the creators, and/or supplemental online content information relating to the online content created by the creators.

8. The system of claim 7, wherein the one or more processors are further configured by machine-readable instructions to:
organize the supplemental creator information and the supplemental online content information into creator profiles for the individual ones of the creators, wherein the supplemental creator information relating to the first creator and/or the supplemental online content information relating to the content generated by the first creator are included in the first profile.

9. The system of claim 1, wherein the one or more processors are further configured by machine-readable instructions to:
determine ranking values for the one or more of the individual ones of the creators based on the creator information relating to the one or more of the individual ones of the creators and/or the content information relating to the content generated by the one or more of the individual ones of the creators.

10. The system of claim 1, wherein effectuating presentation of the creator profiles includes effectuating presentation of a comparison of the creator profiles for at least two of the individual ones of the creators identified.

11. A method for generating online content creator profiles and providing a searchable platform for the online content creator profiles, the method being implemented by a computer system including one or more physical processors configured by machine-readable instructions, the method comprising:
collecting creator information from multiple online sources including distribution platforms and/or data collection entities, the creator information including monetization information, the monetization information providing direct indications of revenue generated by the creators, such that an indication of revenue generation by an individual creator includes one or more of a total revenue generated for content created by the individual creator, revenue generated for a specific time period, or change in revenue generated for content created by the individual creator over a specific time period;
obtaining supplemental creator information, the supplemental creator information relating to creators of online content;
obtaining online content information from the multiple online sources, the online content information relating to the online content created by the creators, the online content information including consumption information;
organizing the creator information, the supplemental creator information, and the online content information into creator profiles for individual ones of the creators, the creator profiles including a first profile for a first creator and a second profile for a second creator, wherein the creator information and the supplemental creator information relating to the first creator and the online content information relating to content generated by the first creator are included in the first profile, and the creator information and the supplemental creator information relating to the second creator and the online content information relating to content generated by the second creator are included in the second profile;
receiving user defined search parameters defining a search query, wherein the user defined search parameters indicate the creator information including the monetization information;
identifying one or more of the individual ones of the creators based on the creator information including the monetization information included in the creator profiles for the one or more of the individual ones of the creators satisfying the user defined search parameters, wherein the first creator is identified based on the creator information including the monetization information included in the first profile satisfying the user defined search parameters;
effectuating presentation of the creator profiles for the one or more of the individual ones of the creators identified, such that presentation of the first profile is effectuated.

12. The method of claim 11, wherein the creator information includes information describing one or more of the creators of the online content, distribution platform accounts associated with the creators, and/or content channels managed by the creators, the creator information including one or more of a name, a username, a location, an image, a ranking, demographic information, a manager of the creator, creator preferences, contract information, contact information, publications, subscribers and/or followers, likes, and/or upvotes received.

13. The method of claim 11, wherein the user defined search parameters further indicate the online content information and the identification of one or more of the individual ones of the creators is further based the online content information, wherein the online content information includes information describing one or more of individual sets and/or portions of the online content created by the creators, collections of the individual sets and/or portions of the online content created by the creators, distribution platforms for the online content created by the creators; and/or content channels for the online content created by the creators, the online content information including one or more of a format, length, quality, size, type, language, category and/or genre, consumption information, a target audience, a rating, a raking, the online content, and/or a portion of the online content.

14. The method of claim 11, wherein the user defined search parameters further indicate the consumption information and the identification of one or more of the individual ones of the creators is further based the consumption information, wherein the consumption information includes information related to reach and/or consumption of one or more of individual sets and/or portions of the online content created by the creators, collections of the individual sets and/or portions of the online content created by the creators, distribution platforms for the online content created by the creators; and/or content channels for the online content created by the creators, the consumption information including one or more of a view count, a monthly view count, a quantity of social media likes, a quantity of social media shares, a quantity of upvotes, a quantity of subscribers and/or followers, and/or monetization information.

15. The method of claim 11, further comprising:
receiving a command, over the network, from a client computing platform associated with a user, to export the creator information and the online content information included in the creator profiles for the one or more of the individual ones of the creators identified, wherein the command indicates an export format selected by the user;
transmitting the creator information and the online content information included in the creator profiles for the one or more of the individual ones of the creators identified over the network according to the export format selected by the user.

16. The method of claim 15, wherein the export format selected by the user includes one or both of a spreadsheet format and a presentation format.

17. The method of claim 11, further comprising:
receiving, over the network from one or more client computing platforms associated with the creators and/or other users, the supplemental creator information relating to the creators, and/or supplemental online content information relating to the online content created by the creators.

18. The method of claim 17, further comprising:
organizing the supplemental creator information and the supplemental online content information into creator profiles for the individual ones of the creators, wherein the supplemental creator information relating to the first creator and/or the supplemental online content information relating to the content generated by the first creator are included in the first profile.

19. The method of claim 11, further comprising:
determining ranking values for the one or more of the individual ones of the creators based on the creator information relating to the one or more of the individual ones of the creators and/or the content information relating to the content generated by the one or more of the individual ones of the creators.

20. The method of claim 11, wherein effectuating presentation of the creator profiles includes effectuating presentation of a comparison of the creator profiles for at least two of the individual ones of the creators identified.

* * * * *